United States Patent
Mixon

(10) Patent No.: US 6,515,456 B1
(45) Date of Patent: Feb. 4, 2003

(54) BATTERY CHARGER APPARATUS

(75) Inventor: Timothy S. Mixon, Hood River, OR (US)

(73) Assignee: Mixon, Inc., St. Paul, MN (US)

( * ) Notice: Subject to any disclaimer, the term of this patent is extended or adjusted under 35 U.S.C. 154(b) by 0 days.

(21) Appl. No.: 09/972,358

(22) Filed: Oct. 5, 2001

Related U.S. Application Data

(63) Continuation-in-part of application No. 09/548,541, filed on Apr. 13, 2000, now Pat. No. 6,353,306.

(51) Int. Cl.[7] .................................................. H02J 7/00
(52) U.S. Cl. ....................................... 320/160; 320/137
(58) Field of Search ................................ 320/160, 137, 320/134, 162, 103, 104

(56) References Cited

U.S. PATENT DOCUMENTS

| | | | |
|---|---|---|---|
| 5,402,007 A | 3/1995 | Center et al. ............... | 290/408 |
| 5,602,459 A | 2/1997 | Rogers ....................... | 320/138 |
| 5,623,197 A | 4/1997 | Roseman et al. ........... | 320/134 |
| 5,703,476 A | 12/1997 | Merlo et al. ................ | 323/313 |
| 5,773,964 A | 6/1998 | Peter ........................... | 322/20 |
| 5,929,613 A | 7/1999 | Tsuchiya et al. ............. | 322/58 |
| 6,424,157 B1 * | 7/2002 | Gollomp et al. ............ | 324/430 |

* cited by examiner

*Primary Examiner*—Edward H. Tso
*Assistant Examiner*—Lawrence Luk
(74) *Attorney, Agent, or Firm*—Haugen Law Firm PLLP

(57) ABSTRACT

A system for actively controlling the charging profile of a battery uses a software-based alternator control unit to control the charging voltage. The system optimizes battery and alternator life. The system, on a dynamic basis, uses battery open-circuit voltage (OCV) to estimate battery state-of-charge (SOC). Also, the charging current of the battery is periodically estimated; this, after processing, provides an estimated SOC of the battery.

23 Claims, 16 Drawing Sheets

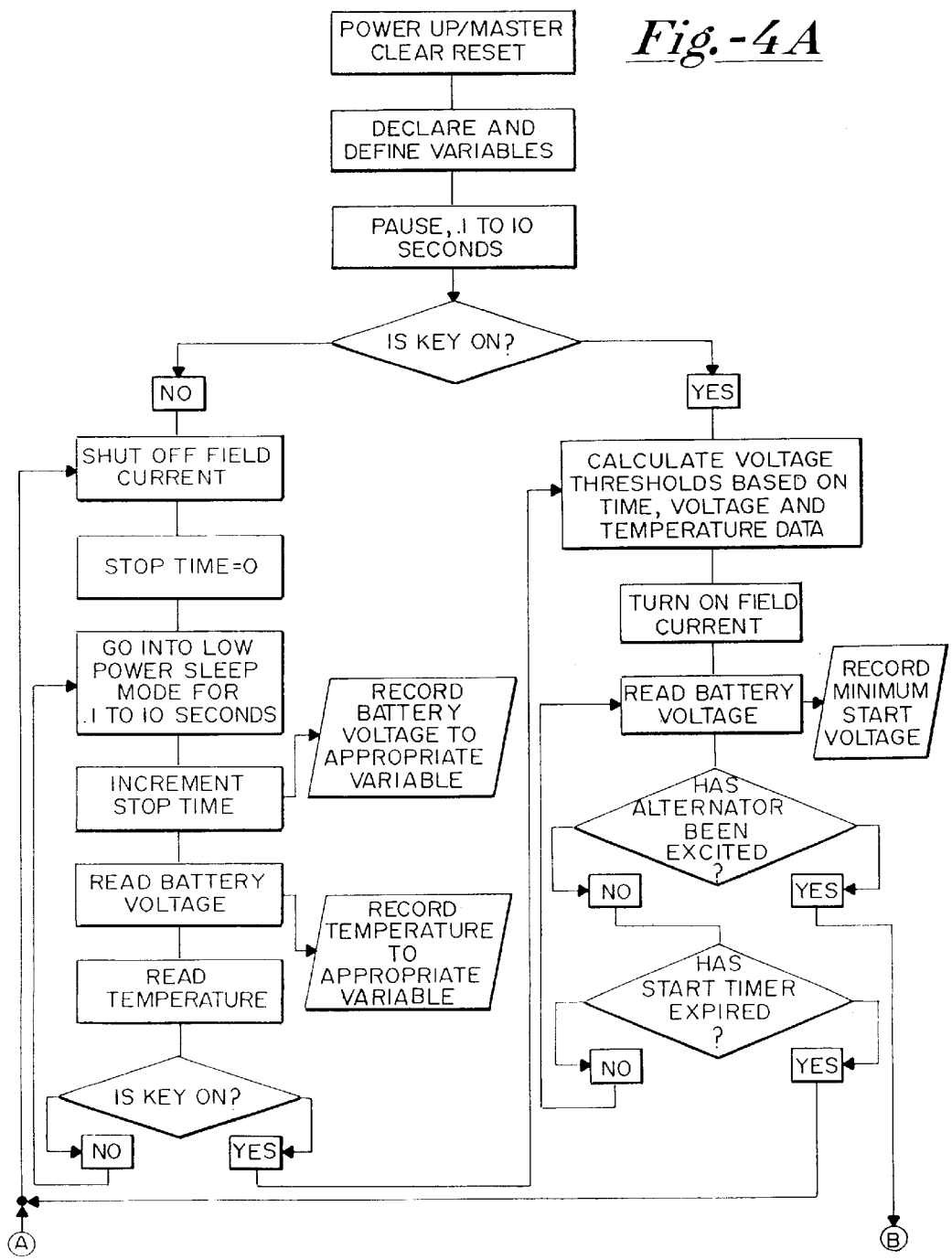

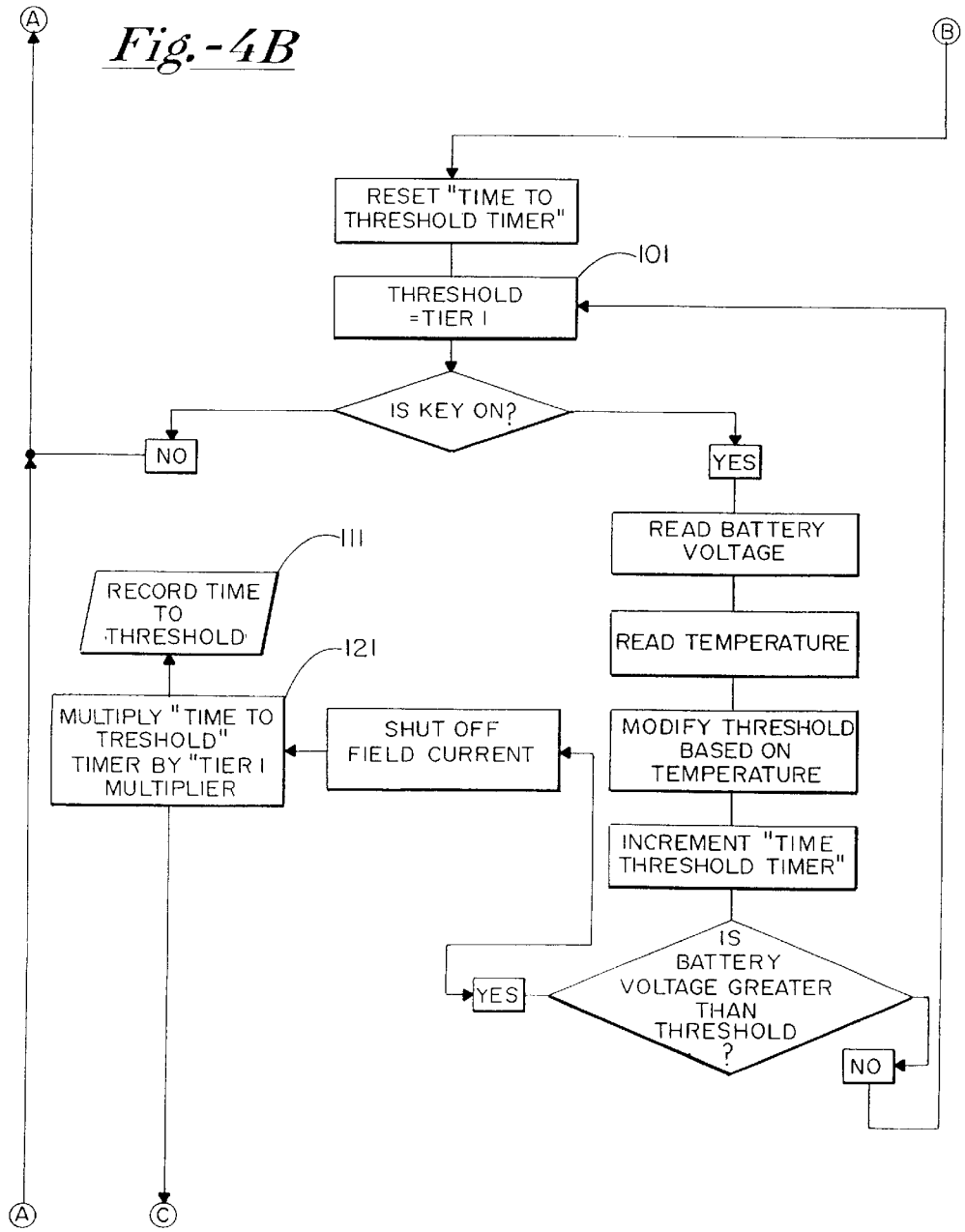

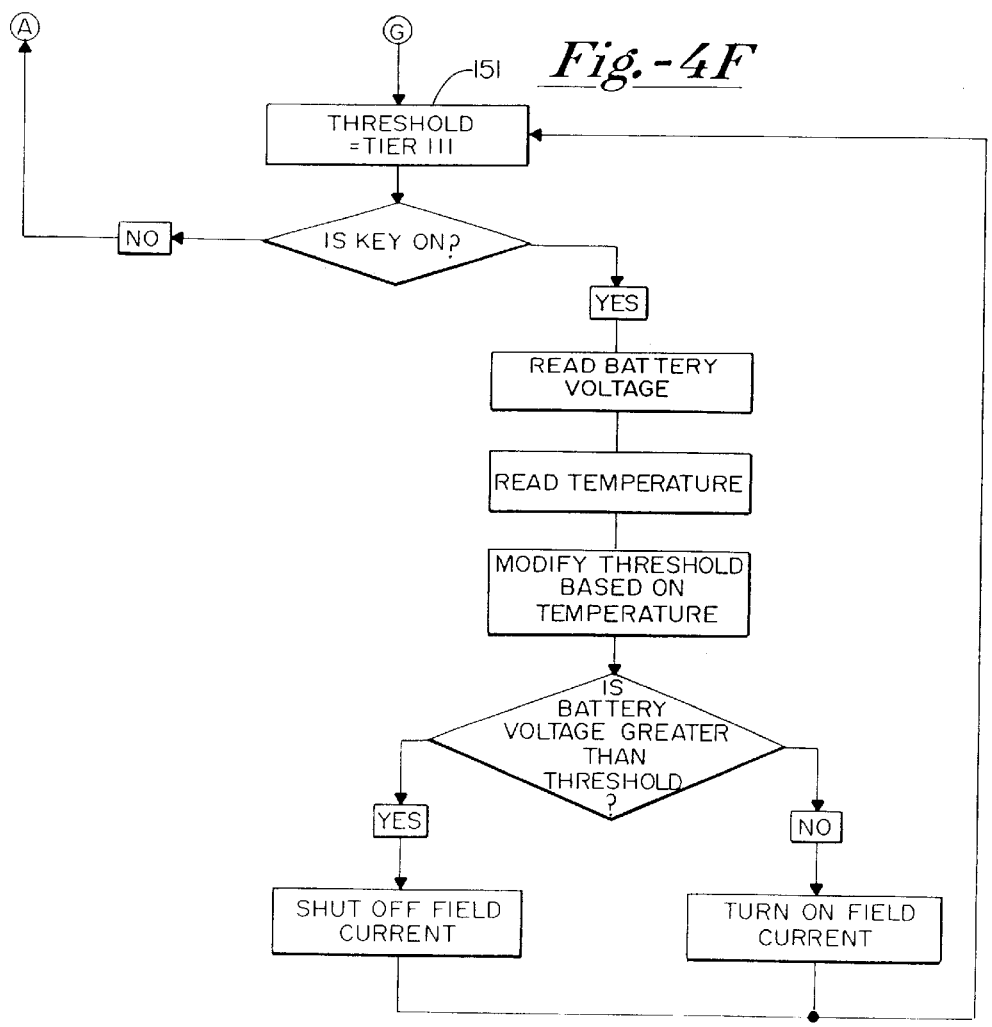

PERCENT VOLTAGE THRESHOLD VS NORMALIZED TEMPERATURE

Fig.-6

| Mode | Tier I Threshold (voltage) | Tier II Threshold (voltage) | Final Threshold (voltage) | Other Thresholds (voltage) | Tier I Multiplier (number) | Mandatory Stay at Tier I (time) | Stay at Tier II (time) | Stay at other Thresholds (time) |
|---|---|---|---|---|---|---|---|---|
| Decrease in minimum start voltage. | ← | ← | ← | ← | ← | ← | ← | ← |
| Increase in start time. | ← | ← | ← | ← | ← | ← | ← | ← |
| Increase in time to reach tier I threshold. | ← | ← | ← | ← | ← | ← | ← | ← |
| Decrease in ambient temperature. | ← | ← | ← | ← | X | X | X | X |
| Decrease in regular temperature. | ← | ← | ← | ← | X | X | X | X |
| Regulator at dangerously high temperature. | ↑↓→ | ↑↓→ | ↑↓→ | ↑↓→ | X | X | X | X |
| Charging system did not make it to tier I voltage last time. | ← | ← | ← | ← | ← | ← | ← | ← |
| Charging system did not complete tier I voltage last time. | → | → | → | → | → | → | → | → |
| Charging system spent an extended time at final threshold last time. | ← | ← | ← | ← | ← | ← | ← | ← |
| Short surface charge discharge time constant. | ← | ← | ← | ← | ← | ← | ← | ← |
| Battery's open circuit voltage decreased since engine off. | ← | ← | ← | ← | ← | ← | ← | ← |
| Vehicle has not run for an extended period. | ← | ← | ← | ← | ← | ← | ← | ← |

BATTERY CHARGER APPARATUS

CROSS REFERENCE TO RELATED APPLICATIONS

This application is a continuation-in-part of my prior application Ser. No. 09/548,541, filed Apr. 13, 2000, now U.S. Pat. No. 6,353,306.

BACKGROUND OF THE INVENTIONS

The invention of said prior application, Ser. No. 09/549,541, relates to a "smart" voltage regulator for regulating the voltage of an alternator which, in turn, provides a charging current to a storage battery for improving battery performance by maintaining a proper level of charge, and by reducing sulfation on the surface of the plates.

By way of background, motor vehicles in the United States some years ago typically had six-volt systems comprising, in part, a battery, a direct current (DC) generator, a DC starting motor or starter which, when energized, would start an internal combustion engine which, in turn, would drive the DC generator. A voltage regulator connected to the DC generator would control the output DC voltage thereof.

More recently, most motor vehicles in the United States use twelve-volt systems comprising a twelve-volt battery (12 volt being a nominal output voltage thereof), an alternating current (AC) alternator with appropriate rectifying means for providing a DC current, a DC starter, and a voltage regulator for controlling the voltage output of the alternator. Twelve-volt systems are described herein as a reference. The '541 invention works equally well on any voltage system. The regulation set points are adjusted accordingly.

There are a number of uses or scenarios for the above-described 12-volt system, all of which are based on the internal combustion engine and lead-acid battery combination. One use is with "over-the-road" trucks wherein the engines are operated more or less continuously for long periods of time, and thus, few start-up operations requiring battery current for starting are experienced. A large percentage of "passenger" vehicles make fairly frequent starts (one or more per day) with sufficient run time between each start so as to keep the battery charged. On the other hand, there are a number of applications such as recreational boats, recreational vehicles, and antique and specialty cars wherein such vehicles are operated only occasionally, raising the likelihood of the storage battery used for starting the engine being significantly discharged throughout extended intervals during its life.

Another challenging application for a storage battery is in connection with vehicles that make long stops with loads left on, coupled with very little "run time". For example, delivery vehicles serving a high-density business section of a metropolitan area typically make long stops with "flashers" left on, coupled with very little run time between stops. The result is storage batteries that are consistently undercharged, shortening the life of the batteries.

The '541 invention actively monitors the needs of the above uses and changes the storage battery charging profile accordingly.

The goal of the present invention is to optimize battery and alternator life. By monitoring a lead-acid battery's state-of-charge (SOC), and by monitoring the conditions the battery and alternator experience, the present invention appropriately adjusts the alternator's output. Vehicle electrical loads are increasing each year (key-off and well as key-on); constant voltage regulators of the prior art are not able to optimally maintain battery health because battery needs vary widely from situation to situation. This results in batteries that are either overcharged (water loss) or undercharged (sulfation). Both situations significantly reduce battery life. The regulator means provided by the present invention works equally well in over-the-road trucks, as well as city delivery trucks, replacing specific voltage settings for specific vehicle use. The combination of high current and high heat can cause alternators to fail. The present invention regulator extends alternator life by preventing damaging combinations of alternator output current and alternator temperature.

DISCUSSION OF THE PRIOR ART

There are, of course, numerous prior art voltage regulator systems for regulating the output voltage of the generator or alternator. Roseman, et al, U.S. Pat. No. 5,623,197 is an example of a prior art system which teaches the decreasing of the output voltage of the alternator when the battery is significantly discharged, to prevent excessive current from entering the battery. Roseman's application concentrates on nickel-cadmium and sealed lead-acid aviation batteries charged by an aviation electrical generator/starter. The present invention concentrates on lead-acid batteries with very different needs.

Current industry technology emphasizes the constant potential method. This method has its disadvantages. It is difficult to have one optimal voltage setting for all conditions. If the voltage setting is too high, overcharging occurs, causing electrolysis (water use) and reduced battery life. If, however, the voltage is set too low, the battery remains undercharge for extended period, causing sulfation, and reduced battery life.

U.S. Pat. No. 5,703,476 suggests that basing the voltage setting on double slope temperature compensation charged the battery better. Temperature, however, is only one factor in the battery's charging needs. Furthermore, battery temperature and regulator temperature are not often correlated. The physical placement of the battery is often different than the voltage regulator, resulting in poor temperature correlation.

The majority of voltage regulator prior art ignores the health of the battery, the primary role of the charging system. Tsuchiya, et al., U.S. Pat. No. 5,929,613, and Peter, et al., U.S. Pat. No. 5,773,964 are examples of this.

SUMMARY OF THE INVENTION

In broad terms, the '541 invention provides a voltage regulator control which is capable of monitoring battery voltage, alternator voltage, voltage regulator temperature, battery temperature, and time. The regulator adjusts the charging profile based on the history of the foregoing five parameters. These parameters have varying importance depending upon the mode of the vehicle.

The primary purpose of the battery in vehicles is to start the engine. Discharged and failing batteries will have longer starts and lower minimum starting voltages. Therefore, it is wise to closely monitor and record voltage and time during starts. Minimum battery voltage during start, length of start, and the integral of delta voltage versus time may all be recorded by the present invention, and used to adjust charging profile. After the engine is started, the present invention charges the battery back as fast as possible without, however, damaging the battery or alternator. The regulator sets its first threshold (Tier D between 15 and 16 volts. It then records how long it takes to get to the Tier I threshold. This value (time) is used later to adjust the charging profile. Fully charged batteries take seconds to get to the Tier I threshold, while discharged batteries could take tens of minutes. The present invention lowers the system voltage before the risk of overcharging and damage occurs, thus achieving the goal of reaching Tier I threshold by charging the battery as fast as possible without overcharging. This feature also helps to break up sulfation on the battery's plates.

The '541 invention controller keeps the battery at the first threshold for a software-determined length of time depending on the battery state-of-charge (from multiple seconds to minutes).

The smart regulator will then regulate the battery's voltage to a second threshold (Tier II). Tier II is in the voltage range of normal voltage regulators (14–15 volts). The regulator keeps the battery at Tier II for a period to ensure that the battery is fully charged, following which the controller tapers back the battery's voltage to a final threshold, or safe-float voltage. This increases fuel economy, battery life, alternator life, and halogen light life. The float voltage is in the range of 13.5 to 14.2 volts, which is the range similar to over-the-road trucks that spend the vast majority of their time running, and not starting.

Application of the '541 invention may include more than one of the described-above thresholds (Tier I, Tier II, Tier III, etc.), some of which may only be used when the controller deems it necessary based on the history of the system. Vehicles that have not run for an extended period are good examples of this. The controller may deem it necessary to add an extra high voltage phase (14.5 to 15.5 volts), in order to break up sulfation on the storage battery's plates and ensure the storage battery is fully charged. This change in charge profile increases the life of storage batteries for recreational boats, recreational vehicles, and other infrequently driven vehicles.

Batteries that have an abnormally low open-circuit voltage are another example of where the controller may need to add an extra or extended high voltage phase (14.5 to 15.5 volts). Leaving headlights or electrical accessories on while the vehicle is not running induces this situation. Present vehicle charging systems are designed to keep storage batteries charged during normal use. They are not designed to fully recharge the storage battery. Often this results in storage batteries spending extended periods significantly discharge, resulting in storage battery plate sulfation and a reduction in battery life. The '541 invention dramatically changes the charging profile to minimize this problem.

It is advantageous for the '541 invention to communicate the information it collects about the charging system to the user and mechanic.

The '541 invention controls a light in the vehicle's dashboard or elsewhere. The light is flashed in two or more simple patterns. The first may indicate all charging parameters normal; the second pattern may direct the user to have the vehicle checked by a technician, thus giving users feedback before serious problems occur.

The technician is equipped with a hand held data-receiving device. The '541 invention transfers all of the parameters it has recorded to the technician's hand-held device. This is done through serial wire, optical sensor, wireless signal or other means. The hand-held device has software to analyze the data and recommend the technician's next step. This tool will be invaluable for the technician's diagnostic, debug, and preventative maintenance. Current charging system diagnostic tools only attempt to test the charging system's current state. The '541 invention gives the technician the ability to take into account the history of the charging system.

The present invention utilizes a battery's state-of-charge (SOC) to optimize battery and alternator life. Determining a lead-acid battery's SOC is more difficult while the vehicle carrying the battery is in use than while the vehicle is at rest, such as in a garage or parking area. The present invention provides a regulator that uses an algorithm designed around common patterns in automotive and/or truck vehicle use. The present invention is unique in how it determines the battery's SOC. The present invention uses open-circuit voltage (OCV) and battery dynamic charge current to determine the battery's SOC.

DESCRIPTION OF THE DRAWINGS

FIGS. 4A, 4B, 4C, 4D, 4E, and 4F collectively show an example algorithm or flowchart for the '541 invention.

FIG. 6 is a table showing how different conditions from various modes of operation change the battery's charging profile.

DETAILED DESCRIPTION OF THE INVENTIONS

Figure 1A:
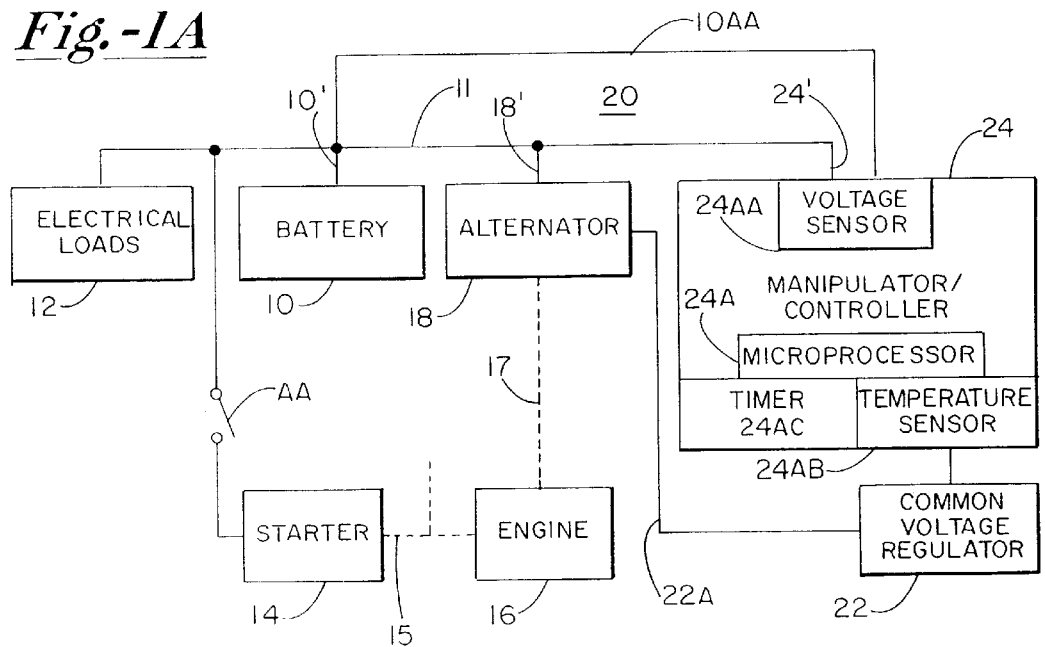
FIG. 1A is block diagram of one embodiment of the '541 invention wherein the key technology is external of the voltage regulator module.
Figure 1B:
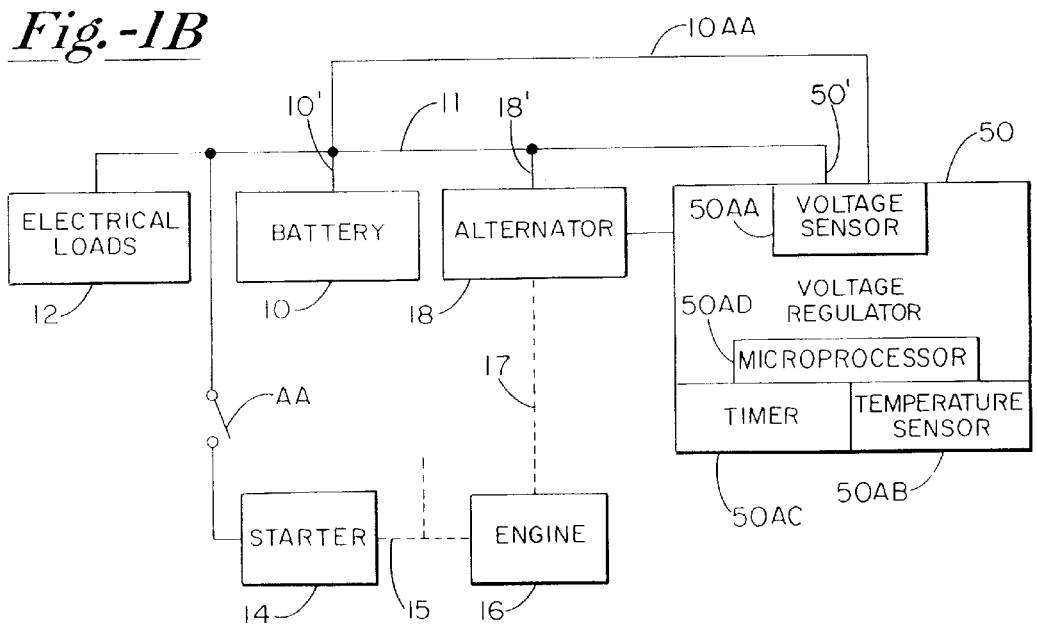
FIG. 1B is a block diagram of an alternative embodiment of the '541 invention wherein the key technology is external of the voltage regulator module.

Referring to FIG. 1A, one embodiment of the '541 invention is shown in schematic block diagram form, and comprises a rechargeable battery 10, a plurality of electrical loads 12, a starter motor 14, an engine 16, and an alternator 18. The battery 10 is connected by 10' to a DC bus 11 to supply a plurality of electrical loads 12, as well as to selectively energize the starter motor 14 upon closing of the ignition switch AA. The starter motor is mechanically linked by 15 to the engine 16, the engine further, when operating, causing the rotation of the alternator 18 through the mechanical linkage 17. The invention further includes a voltage regulator 22 and a special manipulator or controller 24 provided by this invention. The voltage regulator 22 may be of any of the several commercially available voltage regulators in widespread use, or a voltage regulator incorporating the present invention's controller technology as disclosed in FIG. 1B. The controlling output for the alternator from the voltage regulator is applied via a connection 22AA to the alternator 18, to thus control the output voltage and current flow from the alternator to the bus 11 (via connection 18'), and thus to the battery 10, as well as the electrical loads 12. A connection 24' connects bus 11 with a voltage sensor 24AA of voltage controller 24 as a first input thereto, this input being indicative of the alternator voltage.

A second input to the controller 24 is battery voltage. This is provided by a connection 10AA between battery 10 and voltage sensor 24AA. It should be understood that, depending on several factors such as the current draw or the electrical loads 12 and the I²R losses in the current carrying lines or conductors, the battery and alternator voltages often are different and sometimes greatly different.

A third input to the controller 24 is a control signal indicative of the temperature of the voltage regulator from an appropriate sensor 24AB. Finally, a timer 24AC connected by appropriate means provides yet another or fourth input to the controller 24.

Thus, in broad terms, the controller 24 of FIG. 1A is connected to receive and monitor battery voltage, alternator voltage, voltage regulator temperature, and time.

The temperature sensors 24AB may be any suitable sensors such as a thermistor or other sensor, as are well known to those skilled in the art.

The controller 24 preferably includes a microprocessor 24A having functions which are responsive to the example flowchart shown in FIGS. 4A–4F.

As described above, the controller 24 may be external of the standard voltage regulator 22. The controller works by sensing battery voltage and then sending signals to the voltage regulator's sense input. This gives the invention control over the standard voltage regulator. However, in some instances, such as new equipment, it may be advantageous to have the controller internal, or integral, with the voltage regulator module; this is disclosed in FIG. 1B wherein similar elements are identified by the same reference numbers or letters. In this case, the smart regulator controls the alternator field current like standard regulators, but varies charge profile based on battery need. Thus, in FIG. 1B, the voltage regulator 50 comprises a voltage sensor 50AA connected by 10AA and 50' to measure and provide inputs indicative of the battery and alternator voltage respectively; and temperature sensor 50AB, timer 50AC, and microprocessor 50AD which correspond respectively to elements 24AB, 24AC, and 24A of FIG. 1A to thus provide temperature and time inputs.

First Threshold

As indicated, the controller 24 (or 50 in FIG. 1B) monitors battery voltage, alternator voltage, regulator temperature, and time. After the engine is started, the controller's job is to charge the battery back as fast as possible without damaging the battery or alternator. The smart regulator sets the first threshold (Tier I) for the battery between 15 and 16 volts. This is indicated in FIG. 4B by reference numeral 101. The apparatus then records how long it took for the battery to get to the Tier I threshold, this being designated by reference numeral 111 in FIG. 4B. This value (time) is used later to adjust the charging profile. Fully charged batteries take seconds to get to Tier I threshold, while discharged batteries take tens of minutes. In the voltage charging profile shown in FIG. 2, the designator BB represents the battery voltage reaching the Tier I threshold.

Referring again to FIGS. 4A and 4B (an example algorithm), the time to threshold measurement at 111 is multiplied at 121 by a Tier I multiplier. This has the effect on the alternator to maintain the battery voltage at the Tier I threshold for as long as it took to get there times an appropriate multiplier, or a Tier I multiplier; this multiplier may be around one (1) but may range from 0.1 to 10 depending upon applications and history of the charging system. This factor becomes more significant as Tier I time periods increase.

The smart regulator may keep the battery at the first or Tier I threshold for a short period of time (less than 60 seconds) regardless of how long it initially took to get there; this breaks up sulfation that has formed on the battery plates and replaces current lost during starting. This is done for a short period of time so that overcharging does not occur.

Second Threshold

The smart regulator will regulate the battery's voltage to a second threshold (Tier II) when it is finished with the first. Tier II is the voltage range of normal voltage regulators (14–15 volts). The Tier II threshold is set by the software based on the immediate needs and past history of the battery. The smart regulator keeps the battery at Tier II to ensure that the battery is fully charged; the progression from Tier I threshold to Tier II threshold is depicted in the flowchart on FIG. 4E, resulting at the top of the FIG. 4E with box 141 designating a Tier II threshold.

The smart regulator keeps the battery at Tier II to ensure that the battery is fully charged for a software-determined length of time, following which the regulator then tapers back the battery's voltage to a Tier III threshold indicated by reference numeral 151 in FIG. 4F.

Figure 2:
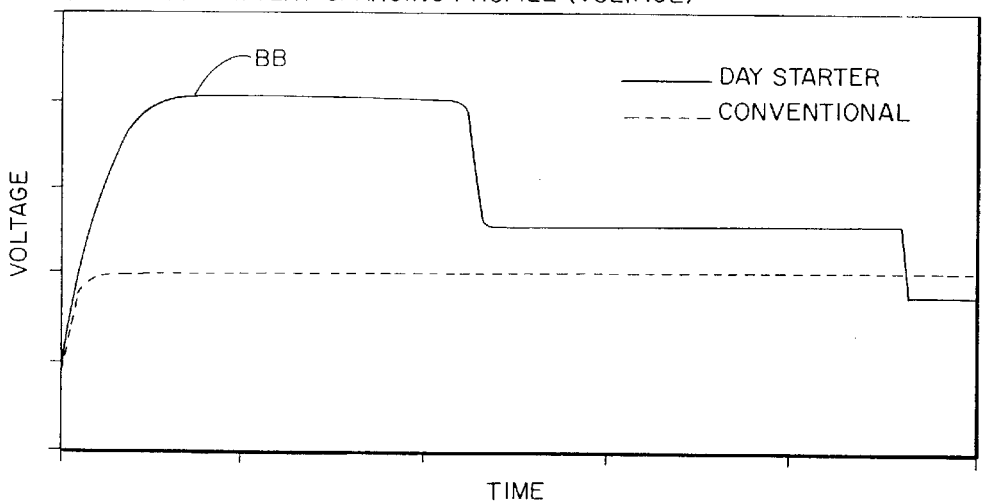
FIG. 2 is a simplified battery charging profile showing the voltage applied to the battery as a function of time, with the profile of the '541 invention being contrasted with conventional arrangements.
Figure 3:
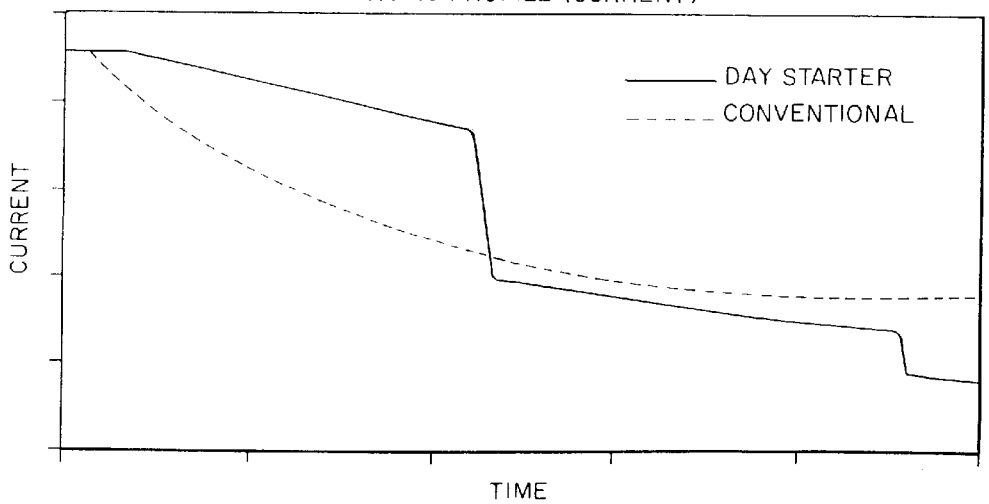
FIG. 3 is a simplified battery charging profile showing current delivered to the battery as a function of time, with the profile provided by the '541 invention being contrasted with that by conventional arrangements.
Figure 4C:
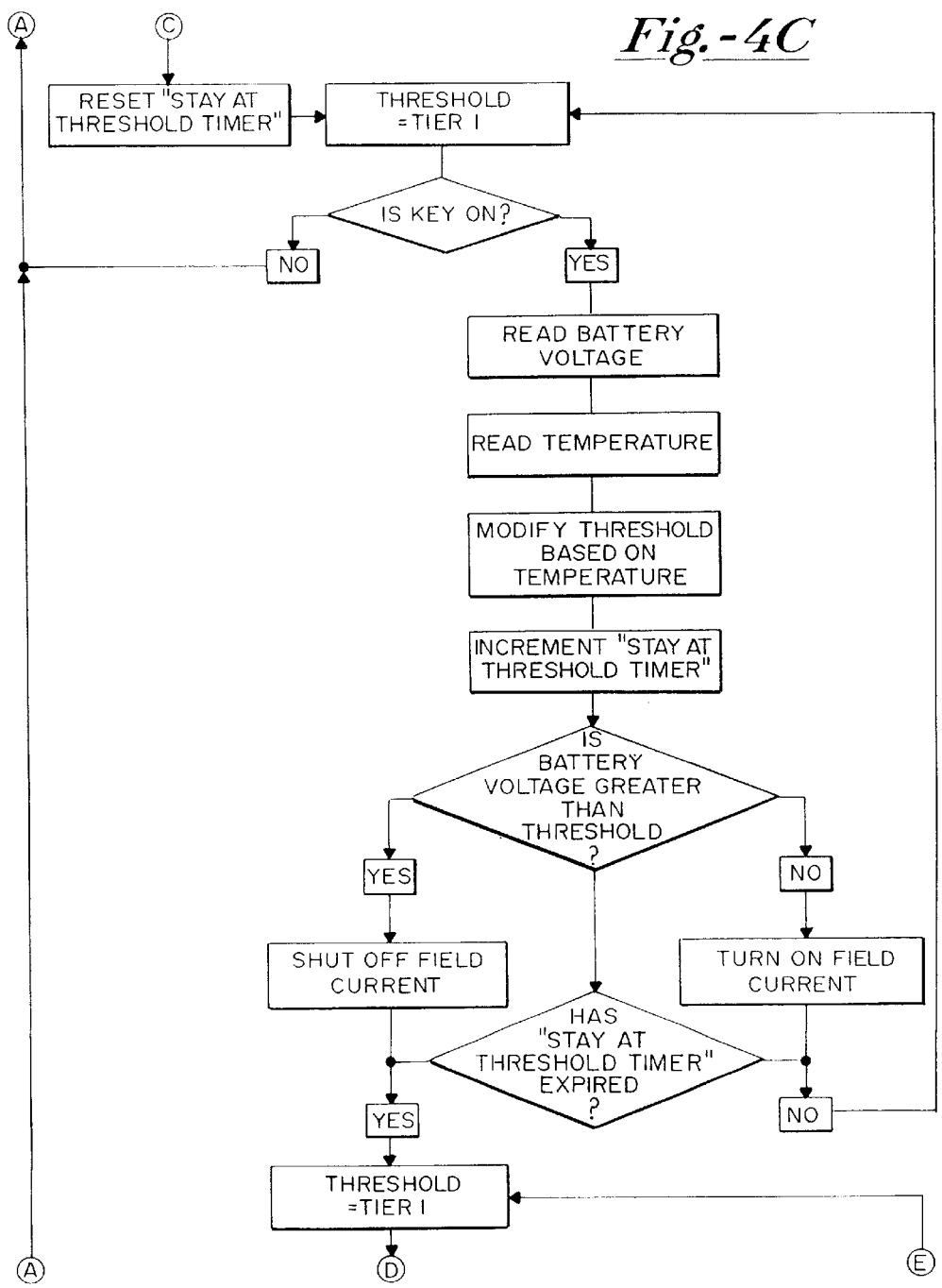
Figure 4D:
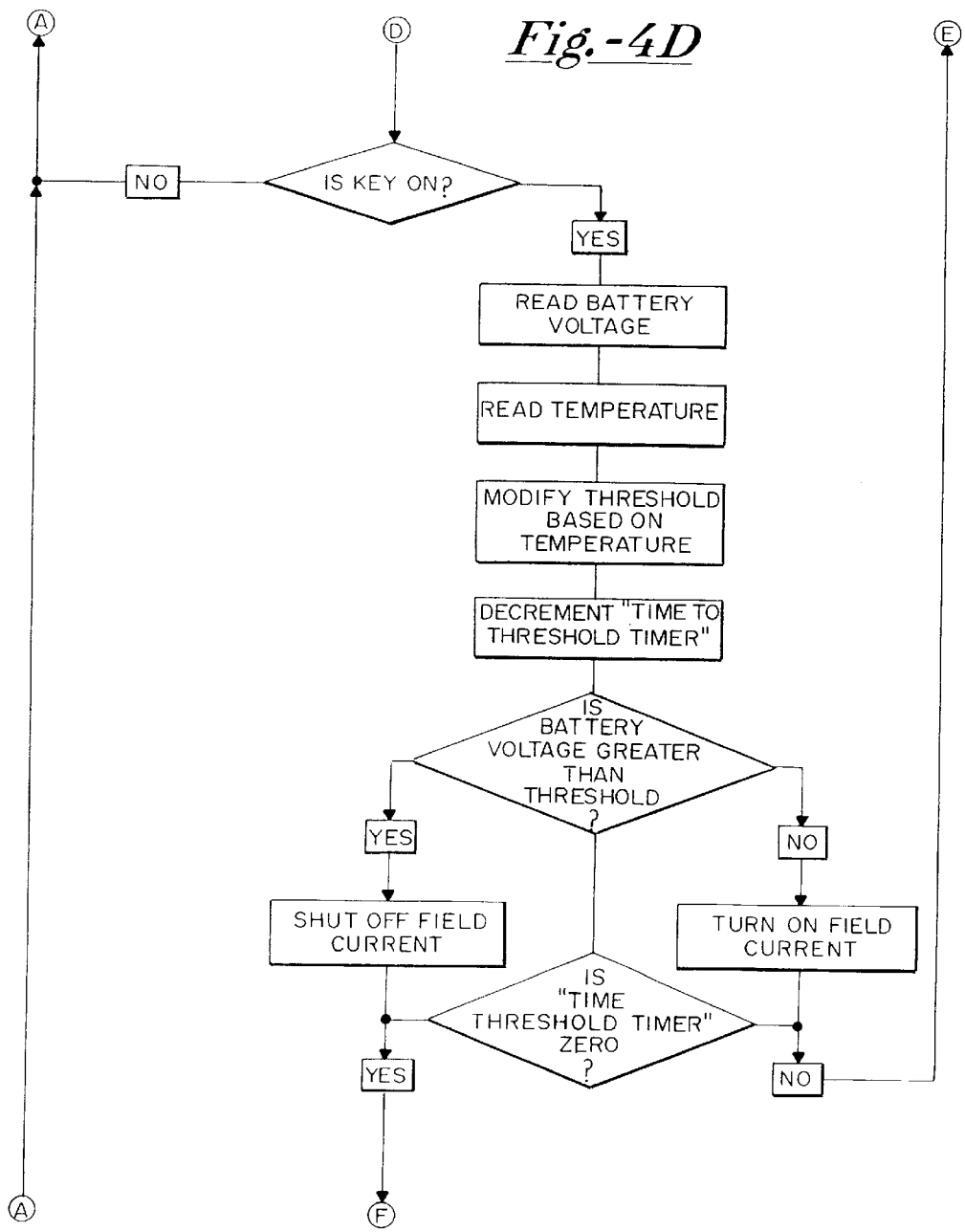
Figure 4E:
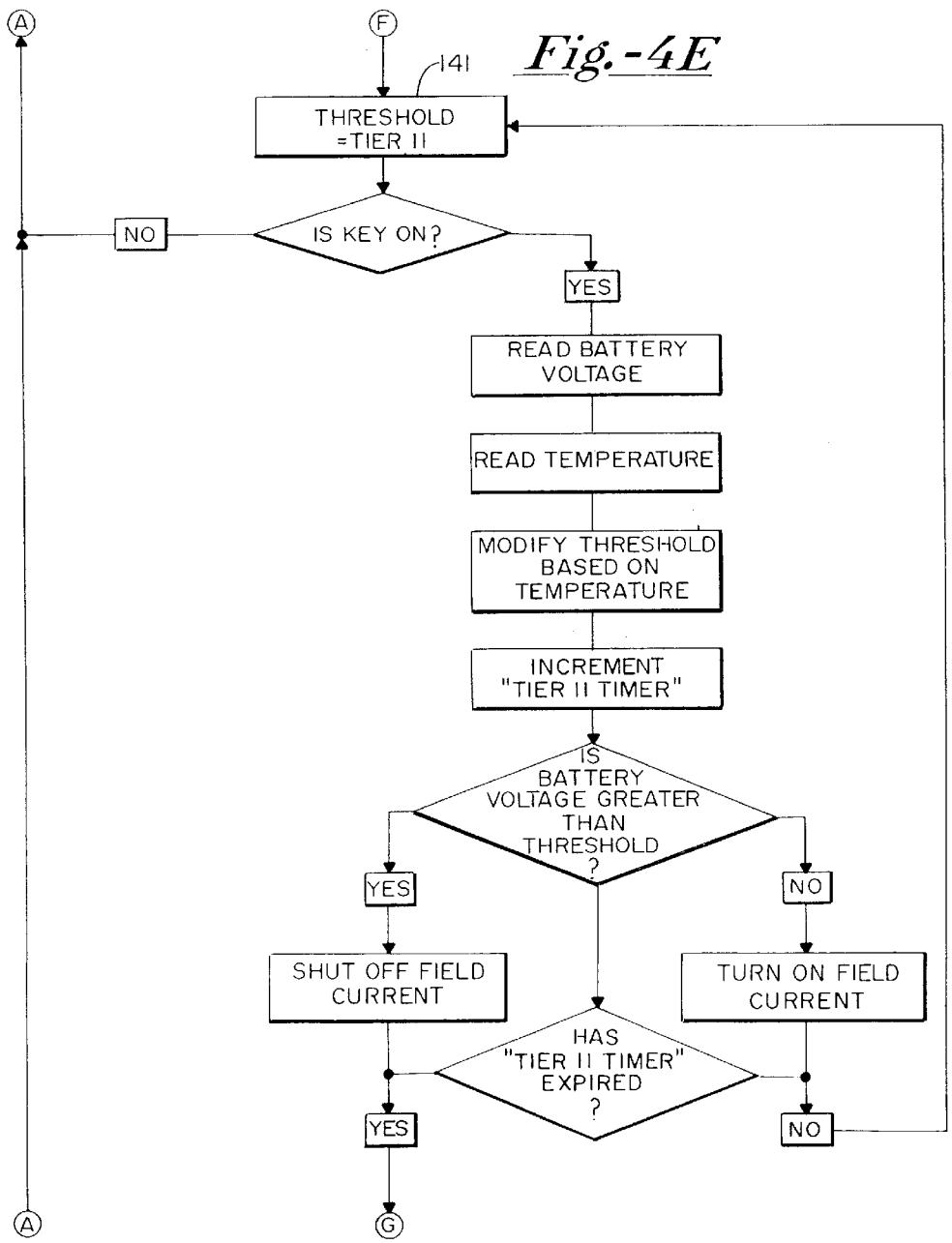

As indicated above, reference BB on the voltage profile shown in FIG. 2 is indicative of the Tier I threshold. After a passage of time, the voltage set point decreases to the Tier II threshold represented on FIG. 2 by the designator CC. Finally, the smart regulator causes the alternator voltage to decrease to the float level represented by DD in FIG. 2. It may be noted in FIG. 2 that the float voltage DD is somewhat less than the steady-state voltage from a conventional system. Likewise, FIG. 3 depicts the simplified battery current charging profile for the present invention as contrasted with a conventional apparatus. It will be seen that with the present invention, the charging current is maintained at a high level until the end of the Tier I threshold, following which the current drops significantly to a level below that of conventional apparatus.

Monitoring Alternator and Battery Current

Knowledge of battery state-of-charge (SOC) is one of the present invention's goals. Therefore, it is wise to monitor current into the battery. Measuring or calculating the voltage drop between the alternator and battery accomplishes this. This drop is proportional to the alternator current and wire resistance. The drop due to external loads can be measured by briefly dropping the system voltage to near the battery's instantaneous open-circuit voltage. At which point the voltage drop from the alternator to battery charge current can be calculated by subtracting the external load voltage drop from the total voltage drop.

Significance of Temperature

Figure 5:
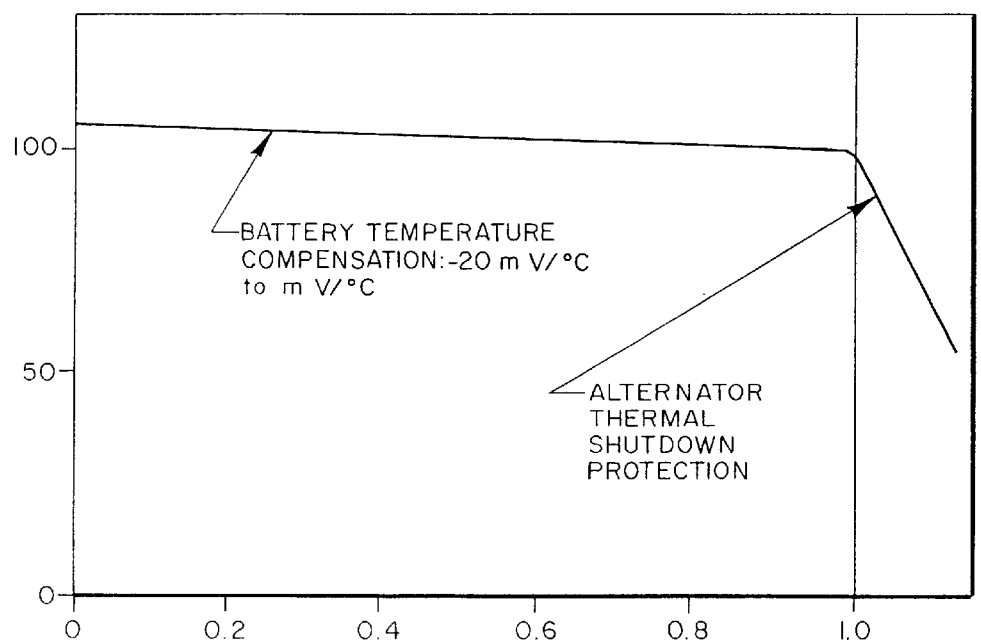
FIG. 5 shows a graph of percent voltage threshold versus temperature, in connection with alternator thermal shutdown protection.

Both the alternator and battery are affected by temperature. The smart regulator of the '541 invention monitors its own temperature to adjust the charge profile. It is important to protect the alternator because diodes and windings fail at high temperatures. The regulator monitors its own temperature and extrapolates the battery diode and winding temperatures. Another concern is that a vehicle's battery may not be at a similar temperature as the voltage regulator because it is not near the alternator; in this case the battery's temperature is not well correlated to the regulator's temperature. Certain delivery trucks are a good example of this because the battery for same is under the step. For this reason, the controller provided by this invention must use ambient temperature as well as current regulator temperature to adjust the current charging profile. Ambient temperature is acquired by sensor 24AB recording regulator temperature before start if the vehicle has been off for an extended time of hours. The controller protects the alternator because it has the ability to shut down the alternator when it reaches critical temperatures; this is depicted in FIG. 5. It will be appreciated that battery temperature may be sensed either directly or indirectly. When sensed directly, a suitable probe is placed in contact with the battery structure per se, with indirect sensing being utilized in other cases where the immediate ambient temperature, through experience, may be utilized as a reasonably accurate reference.

Engine Off

When the engine stops running, the controller of the present invention still monitors voltage time and temperature. A surface charge remains on the battery plates immediately after the engine turns off, leaving a fully charged battery's open-circuit voltage between 13 and 14 volts. This open-circuit voltage is not a good indicator of state-of-charge. The controller of this invention may, however, monitor the discharge time constant of the battery's drift down to a normal open-circuit voltage. This time constant depends on state-of-charge, parasitic or "key-off" load current and previous charge current.

Extended Stops

Extended stops also help the smart regulator of the present invention to determine the battery's state-of-charge (SOC). The regulator adjusts the charge profile based on open-circuit voltage (OCV). Batteries that have low open-circuit voltages after extended stops are charged differently from batteries with normal open-circuit voltages. It also adjusts the charge profile based on how long the engine has been off. This is beneficial to vehicles that are driven inconsistently, such as snowplows, tractors, third cars, and the like. Initial high-voltage charging of batteries that have sat for weeks or months helps break up sulfation on the battery's plates.

Accumulation of battery plate sulfation severely shortens the battery's life. The invention actively attacks it with every start.

Compilation of how Charging Profile is Adjusted

FIG. 6 is a table, or compilation, of how the battery charging profile is adjusted, with the table tabulating a number of situations, each of which affects charging profile. It will be understood that the controller provided by the '541 invention may only use a few of the adjustments listed, or may use any of them.

Figure 7:
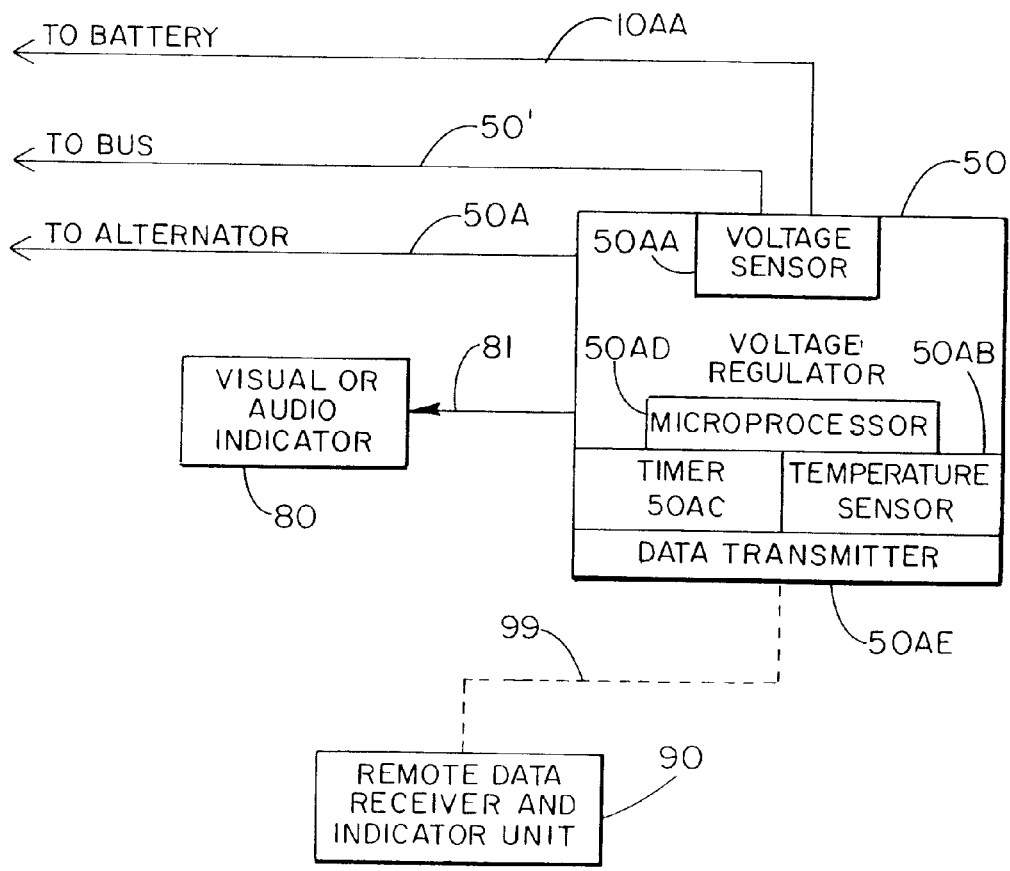
FIG. 7 is a partial block diagram of another embodiment of the '541 invention wherein critical data concerning the battery may be transmitted to a remote (or local) receiving station.

FIG. 7 schematically shows another embodiments of the '541 invention. The controller 50 is the same as that of FIG. 1B, except it further includes (i) an output data 81 connected to an indicator means 80, and (ii) a data transmitter 50AE connected by suitable means 99 (such as serial wire, optical or infrared sensors, wireless, etc.) to a remote data receiver and indicator unit 90 which may be hand-held.

The indicator 80 may be a light on the vehicle which may be flashed or operated in alternate patterns: a first to indicate that all battery charging parameters are normal, and a second directing the user to have the system checked before a serious problem occurs.

The data transmitter function 50AE of the controller of FIG. 7 transfers all (or selected ones) of the parameters recorded to the remote unit 90, which has appropriate software to analyze the data and to recommend the next step. This is invaluable in that it enables a centrally located technician to rapidly take inventory or census of the batteries in a plurality of vehicles. This is not only labor saving, but also identifies system problems before failure occurs; thus preventing road-calls and expensive downtime. In short, the present invention offers significant cost savings for users.

Preferred Embodiment of the Present Invention

Figure 8:
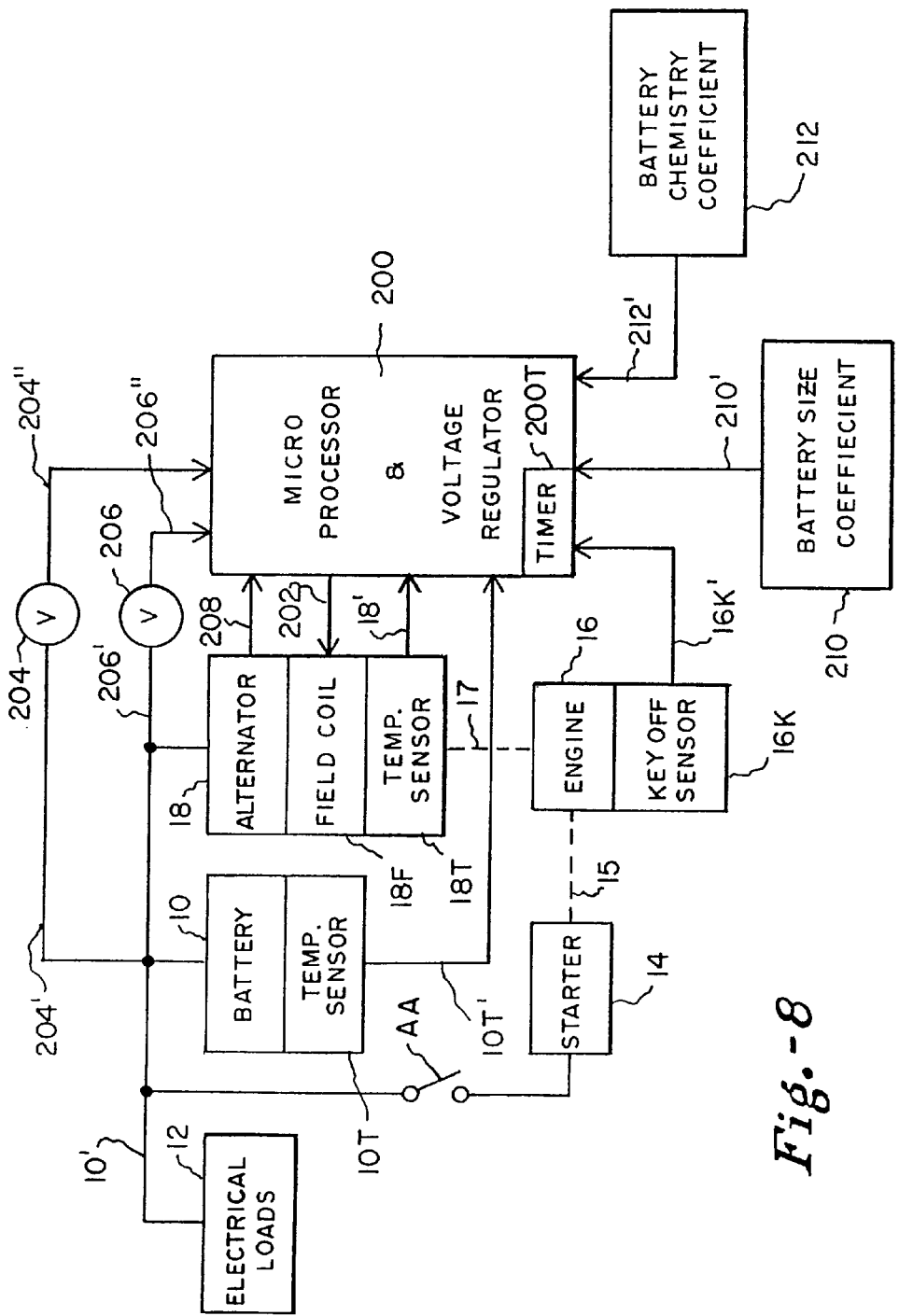
FIG. 8 is a block diagram of one embodiment of the present invention wherein the alternator is controlled by a microprocessor, so as to optimize battery and alternator life, the microprocessor being controlled in part by the battery open-circuit voltage and battery charge current.

The block diagram of this embodiment of the present invention is depicted in FIG. 8, wherein the battery 10 is connected to a DC bus 10' so as to supply a plurality of electrical loads 12, as well as to selectively energize the starter motor 14 upon closing of the ignition switch AA. The starter 14 is mechanically linked by 15 to the engine 16 which, when operating, causes the rotation of the rotor of the alternator 18 through the mechanical linkage 17.

Temperature sensing means 10T is provided for measuring battery temperature. The alternator 18 has a field coil 18F and a temperature sensor means 18T for measuring the temperature of the alternator. The engine 16 has a key-off sensor 16K. A combined microprocessor and voltage regulator 200 is depicted; comprising in part a timer means 200T. The microprocessor 200 includes means for controlling the current in the alternator field coil 18F; this means being identified by reference numeral 202 in FIG. 8. It will be understood that the aforesaid control of the current in the field coil 18F will be effective to control the output voltage of the alternator 18.

In addition to timer 200T, the microprocessor and voltage regulator 200 has a plurality of other inputs. A battery voltage measuring apparatus 204 is connected by lead 204' to the battery 10 and has an output 204" connected to the microprocessor. Another input is the output voltage of the alternator 18; this is accomplished by voltage measuring apparatus 206 connected by lead 206' to the alternator 18 and having an output 206" connected to microprocessor 200. In addition, the battery temperature sensing means 10T is connected by lead 10T' to 200. Likewise, the alternator temperature sensing means 18T is connected by lead 18' to 200. In addition, this embodiment of the invention optionally provides input to the microprocessor indicative of battery size and battery chemistry. More specifically, FIG. 8 depicts a battery size coefficient means 210 connected to the microprocessor via a lead 210', and a battery chemistry coefficient means 212 is connected by 212' to the microprocessor.

The apparatus depicted in FIG. 8 shows the microprocessor function combined with the voltage regulator function; this is a matter of design choice. It will be understood that these functions could be separate, with the microprocessor receiving the above indicated input signals and having an output signal applied to the control means of a standard voltage regulator which, in turn, would provide a control signal to the field coil 18F of the alternator 18 so as to control or regulate the output voltage thereof.

The function of the key-off sensor 16K is to provide a signal indicating that the engine 16 is "off," i.e., not running. Those skilled in the art will understand that various means may be employed to provide this function.

Determining Battery State-of-Charge

Figure 9:
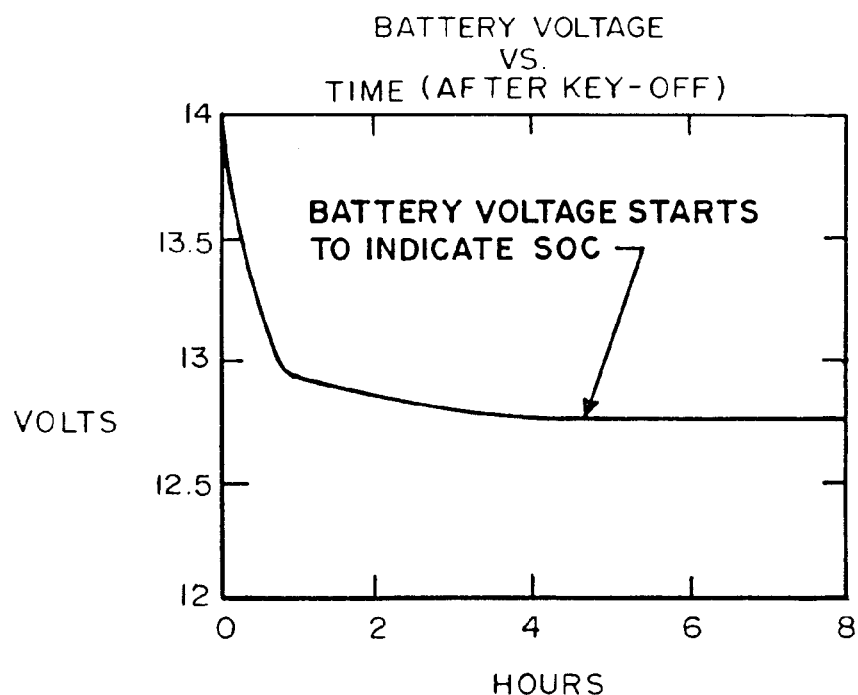
FIG. 9 is a graph which shows how a battery surface charge drains off during extended stops of the vehicle, i.e., a stop of many hours, the graph showing how a typical battery voltage settles during an extended stop.
Figure 10:
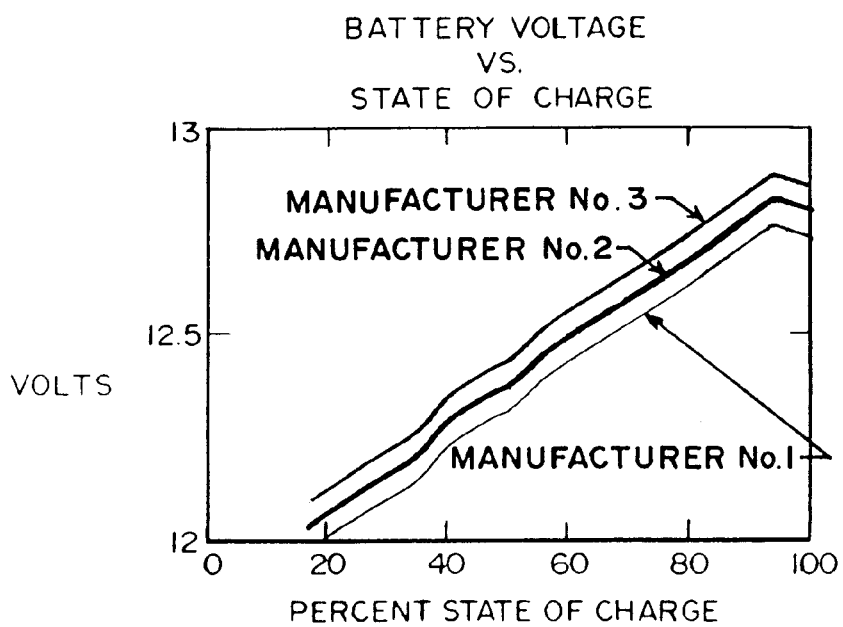
FIG. 10 shows a typical battery voltage versus state-of-charge (SOC) plot of batteries made by three different battery manufacturers.

Determining a lead-acid battery's state-of-charge (SOC) is more difficult while the vehicle using the battery is in use than while the vehicle is at rest, such as in a garage. The invention uses an algorithm designed around common patterns in automotive vehicle use. The invention uniquely determines the battery's SOC by determining open-circuit voltage (OCV) and battery charge current. FIG. 9 shows how a typical battery voltage settles during an extended stop of the vehicle, i.e., key-off; it will be noted from FIG. 9 that for the case presented, the battery voltage starts to indicate a valid state-of-charge after four hours have elapsed since key-off. Surface charge drain time varies greatly depending upon parasitic or key-off load and battery size. FIG. 10 shows a typical battery voltage versus state-of-charge plot for three different typical battery manufacturers. As is well known, different battery manufacturers use slightly different battery chemistries, resulting in a voltage shift as is shown in FIG. 10. The battery chemistry coefficient means 212 shown in FIG. 8 is applied via 212' to the microprocessor 200, which uses logic to compensate for chemistry differences between batteries.

Battery OCV is lowered with cold temperatures and high parasitic or key-off loads.

The invention compensates for this shift. The invention provides sensing means for measuring the battery internal temperature, i.e., sensing means 10T, and estimates parasitic or key-off load by monitoring battery surface charge drain with logic.

Figure 11:
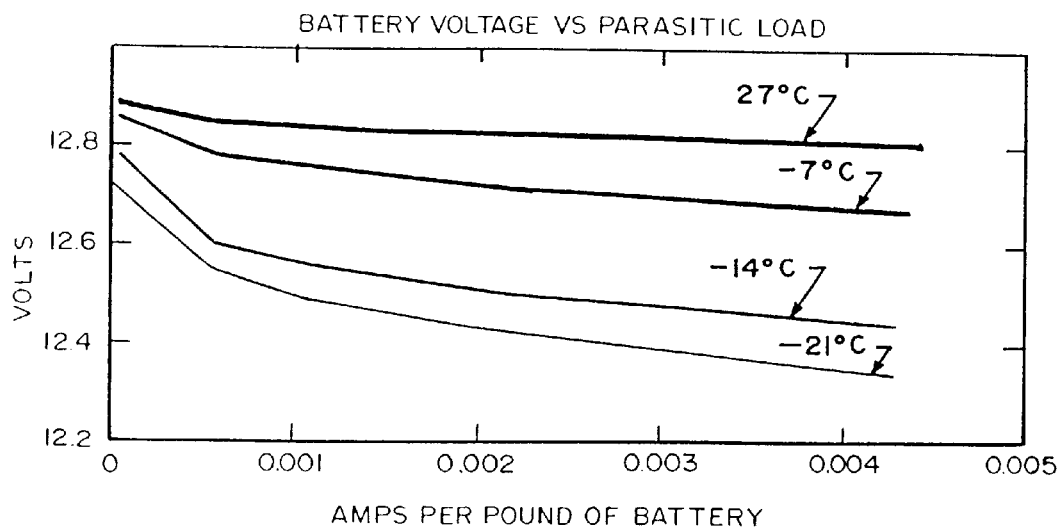
FIG. 11 shows how a fully charged battery's OCV is affected by loads and cold temperatures.

FIG. 11 shows how a fully charged battery's OCV is affected by both loads and cold temperatures; parasitic load is measured in amps per pound of battery on the horizontal scale. This feature also may appropriately relate the ratio of the parasitic load to battery size, if desired. The Figure shows the relationship between battery voltage and parasitic load for four different temperatures. It will be understood, therefore, that the apparatus depicted in FIG. 8 comprises a means for providing voltage regulator control, which is adapted to produce a control signal which is connected to the voltage regulator means to thereby vary the output voltage of the alternator, and thus vary the charging current of the battery. The voltage regulator control means comprising means 204 monitoring battery voltage, including means for monitoring said battery's open-circuit voltage following an extended period of activity of the drive means. The OCV is applied to processing means 200 to provide an estimated state-of-charge of the battery before each resumption of activity of the drive means.

Battery Charge Current

Figure 15:
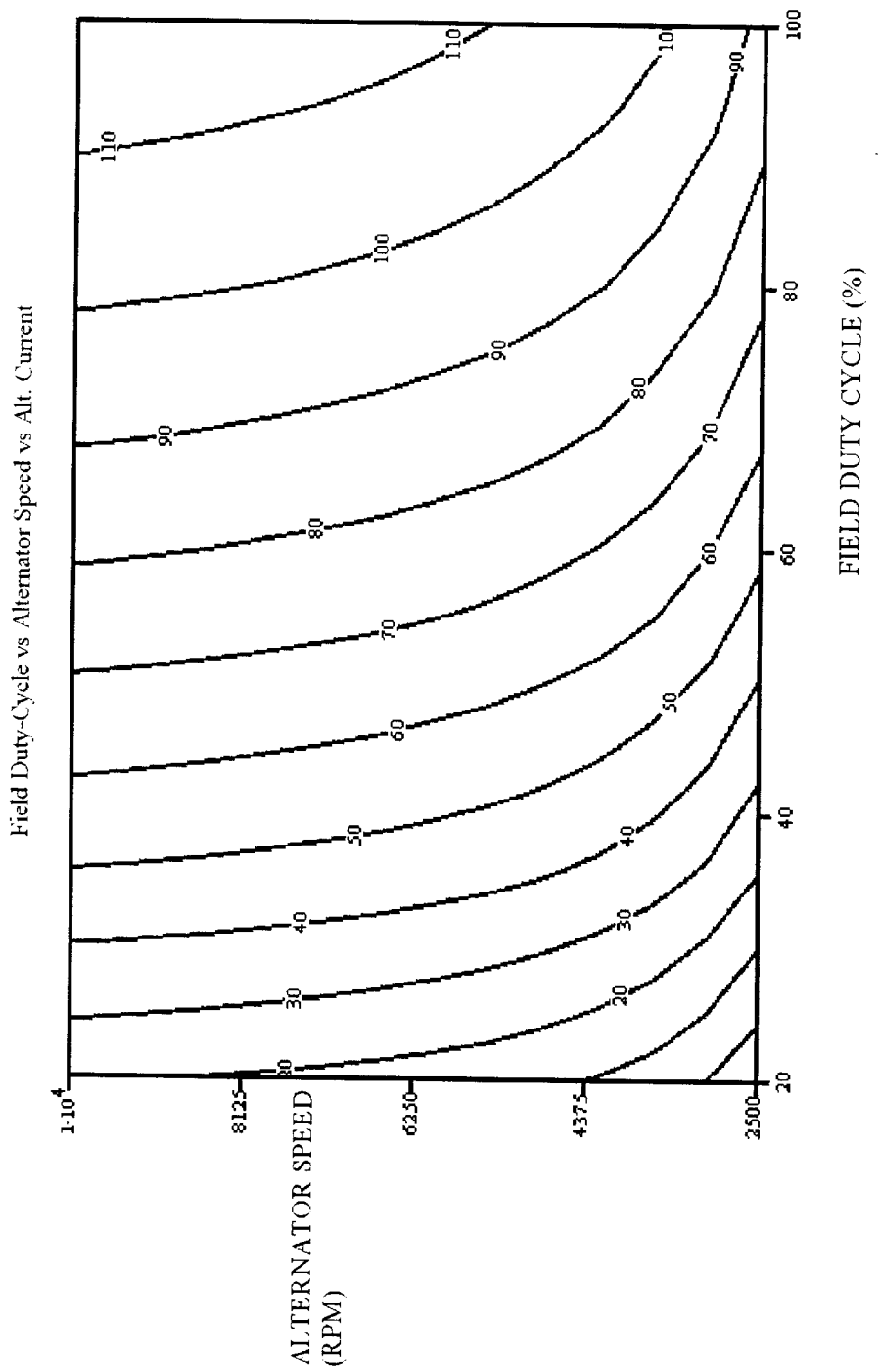
FIG. 15 is a plot of field duty cycle versus alternator current, with the field duty cycle being indicated in duty percent, and with the family of curves indicating specific alternator current."

During charging phases, e.g., above 15 volts, the invention estimates battery charge current periodically. While the monitoring of charge current to determine end-of-charge is a common feature of prior art apparatus, the present invention is unique in how it measures battery current; it does not measure current with external sensors such as a shunt. An alternator's output current is a function of both field current and rotor speed. The invention measures both of these parameters. Alternator field current is measured by calculating the duty cycle of the switching field transistor, and rotor speed is measured by measuring the number of alternator's AC output pulses for a set length of time. Reference is made to FIG. 15 of the drawings where this is demonstrated graphically. These features may be pre-programmed into the microprocessor consistent with the coefficients given for the plots of FIG. 15. This input to the microprocessor is identified by reference numeral 208.

Figure 12:
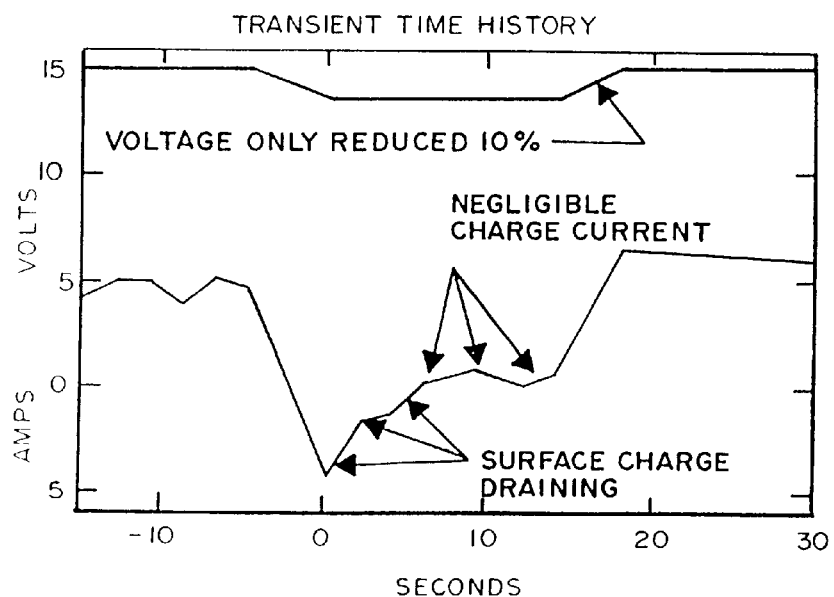
FIG. 12 shows graphs of battery current and battery voltage, both plotted on the vertical axis with a relatively short time base plotted on the horizontal axis, showing how battery current is negligible for a few seconds after the voltage is suddenly reduced ten percent.

The calculation of field current may be facilitated by the use of a map of an alternator's output current plotted with respect to varying field current and rotor speed. This information can be obtained and stored, and the measured data points may be rounded off, or contoured off, for a best-fit function for the measured data points. See typical map in FIG. 15. The microprocessor is programmed with this data. The invention uses the coefficients to measure the alternator's output current at about a preselected voltage, e.g., 15 volts. This computation or measurement by itself, however, does not give any indication as to how much current is actually going to the battery. To discern the difference between battery and external load current, the invention takes advantage of the fact that batteries do not behave like resistors (i.e., current proportional to voltage). Instead, batteries have an internal potential; at rest, a fully charged battery's internal potential (open-circuit voltage) is around 12.7 volts. A charging battery has an internal potential much higher than this. For example, when a battery charging at 15 volts is suddenly dropped to below 14 volts, the battery current goes to a negligible amount after its surface charge drains off. While the surface charge is draining, the battery current is negative and supplies external loads with current. The foregoing is illustrated in FIG. 12, which shows the battery current time history when a charging battery's voltage is suddenly reduced. FIG. 12 shows that the battery current is negligible for a few seconds after the voltage is suddenly reduced. The regulator takes advantage of this effect by calculating output current at both 15 volts and, in this case, 13.5 volts. The regulator uses logic to return the calculation when battery current is negligible. The invention can then calculate battery charge current with the following equation:

$$IB = IA1 - IA2(A1/A2)$$

where IA1 is the current output of the alternator when the alternator is in the first output voltage level A1, and IA2 is the current output of the alternator said alternator is at a second voltage level A2.

Thus, the microprocessor 200 facilitates the estimation of charging current by time, i.e., periodically, suddenly reducing the voltage output of the alternator. These reductions in alternator voltage are very brief.

The ratio of high voltage over low voltage (15 over 13.5 for this example) needs to be included in the equation to account for reduced current to external loads at the lower voltage.

An understanding of battery needs is important for an understanding of the invention. To determine how hard and how long batteries should be charged is a difficult problem because a battery's SOC and water loss are affected by temperature, current, voltage and charge history.

Figure 13:
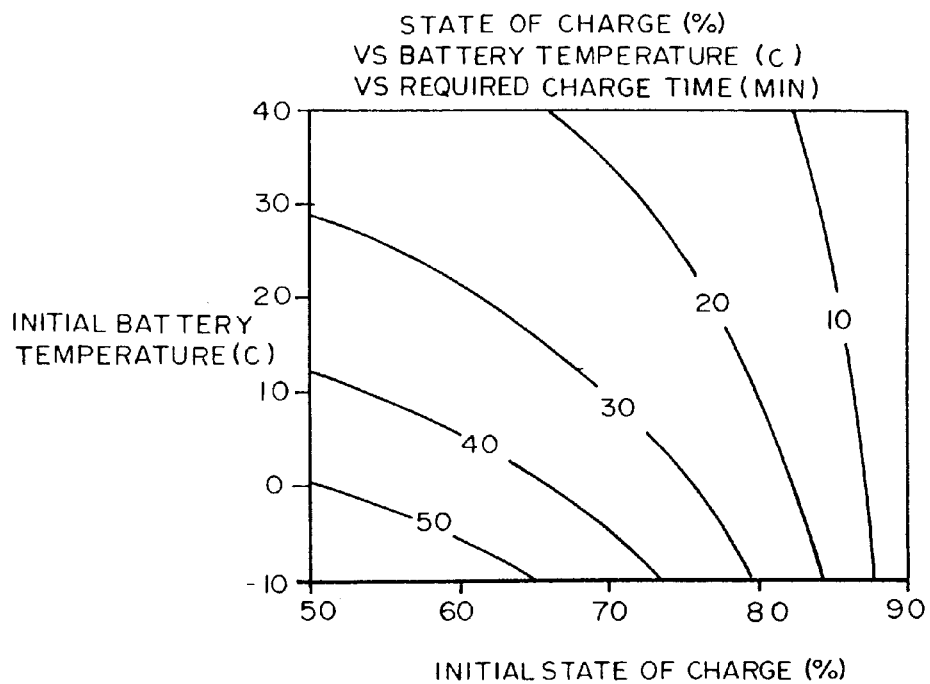
FIG. 13 is a contour plot of a map of how much time batteries take to recharge to ninety-percent SOC from varying SOC and temperatures.

The microprocessor 200 is programmed with a map of how much time batteries recharge to ninety percent to SOC from varying starting SOC's and temperatures. FIG. 13 is a contour plot of this map.

Temperature Compensation

Figure 14:
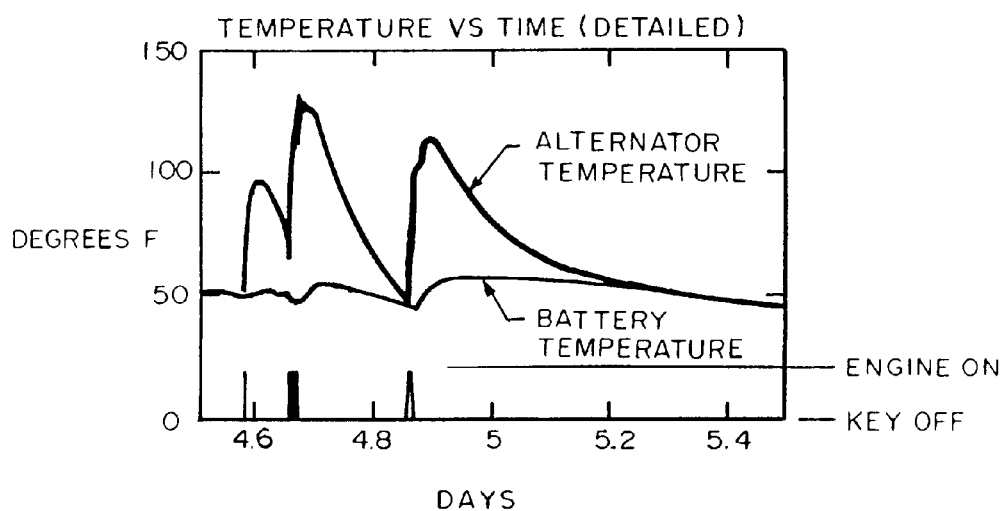
FIG. 14 is a plot of temperature versus time, showing both battery temperature and alternator temperature, plotted against time as expressed as "engine-on" and "key-off.

Temperature compensation is not a new idea to voltage regulators; such prior art arrangements utilize the temperature of the voltage regulator per se. The present invention improves on the prior art by providing temperature compensation utilizing the temperature of the battery. Thus in FIG. 8 the battery temperature sensing means 10T is connected by 10T' as one of the inputs to the microprocessor 200. The difference between battery temperature and alternator temperature is depicted in FIG. 14 for a representative scenario that shows, during times when the engine is on, the alternator temperature is significantly higher than its normal value, whereas the battery temperature is relatively stable, although it tends to increase somewhat following the turning-off of the engine.

While the preferred embodiment of the invention has been illustrated, it will be understood that variations may be made by those skilled in the art without departing from the inventive concept. Accordingly, the invention is to be limited only by the scope of the following claims.

What is claimed is:

1. A battery recharging and maintenance system comprising:
   (a) a battery connected for (i) supplying energy to electrical load apparatus, and (ii) receiving recharging energy from an alternator;
   (b) an alternator connected to drive means for producing electrical energy and connected to supply electrical energy to said electrical load apparatus and to said battery;
   (c) voltage regulator means connected to said alternator and adapted to control said alternator so as to vary the magnitude of the voltage output of said alternator as a function of a control signal applied to said voltage regulator means;
   (d) voltage regulator control means adapted to produce a control signal and being connected to control said voltage regulator means to thereby vary said voltage output of said alternator and thus vary the charging current of said battery, said voltage regulator control means comprising means monitoring battery voltage including means for monitoring said battery's open circuit voltage (OCV) following an extended period of inactivity of said drive means, said OCV being applied to processing means to provide an estimate of state of charge (SOC) of said battery before each resumption of activity of said drive means.

2. Apparatus of claim 1 wherein said alternator comprises field coil means for receiving control current from said voltage regulator means and rotor means connected to said drive means and adapted to be rotated with respect to said field coil means, said voltage regulator control means comprising means for monitoring said control current in said field coil means and for monitoring the angular velocity of said rotor means.

3. Apparatus of claims 1 or 2 including means for estimating charging current of said battery and for applying a signal indicative thereof to said processing means for providing an estimate of SOC of said battery during activity of said drive means.

4. Apparatus of claims 1 or 2 including means for periodically estimating charging current of said battery and for applying a signal indicative thereof to said processing means for providing an estimate of SOC of said battery during rotation of said rotor by said drive means, said means for periodically estimating charging current comprising means for implementing the equation: I (battery)=IA1−IA2 (A1/A2) where IA1 is the current output of said alternator when said alternator is at a first output voltage level A1, and IA2 is the current output of said alternator when said alternator is at a second voltage level A2.

5. Apparatus of claims 1 or 2 including means for periodically estimating charging current of said battery and for applying a signal indicative thereof to said processing means for providing an estimate of SOC of said battery during rotation of said rotor by said drive means, said means for periodically estimating charging current comprising (i) means for calculating output current of said alternator at a first output voltage level A1 thereof, (ii) means for suddenly lowering said alternator output voltage level to a second voltage level A2, (iii) means for calculating output current of said alternator at said second voltage level A2, and (iv) processing means for implementing the equation: IB=IA1−IA2 (A1/A2) where IB is estimated charging current of said battery, IA1 is the calculated output current of said alternator when output voltage thereof is at said first level A1, and IA2 is the calculated output current of said alternator when the output voltage thereof is at said second level A2.

6. Apparatus of claims 1 or 2 including means for providing a signal indicative of the temperature of said battery to said processing means.

7. Apparatus of claim 5 including means for providing a signal indicative of the temperature of said battery to said processing means.

8. Apparatus of claim 1 further characterized by including means for providing a key off signal indicative of the level of current drain from said battery to said processing means during inactivity of said drive means.

9. Apparatus of claim 8 including an input to said processing means indicative of the size of said battery.

10. Apparatus of claim 9 including an input to said processing means indicative of the chemistry of said battery.

11. Apparatus of claim 8 wherein said key off signal is estimated by said processing means with logic by monitoring surface charge drain of said battery.

12. Apparatus of claim 11 including means for providing a signal to said processing means indicative of the temperature of said battery.

13. Apparatus of claim 1 including means for averaging a current OCV measurement of said battery with the average of the OCV measurements for a preselected number of days preceding the current day.

14. Apparatus of claim 1 wherein said processing means has an output controllably connected to said alternator to control the voltage output of said alternator to a first level in accordance with said battery's OCV and estimated SOC following an extended period of inactivity of said drive means and means thereafter responsive to the battery's SOC reaching a preselected level for controlling the voltage level of said alternator to a second preselected level lower that said first level.

15. Apparatus of claim 1 including means for providing a signal indicative of the temperature of said alternator to said processing means, said processing means functioning to reduce output voltage of said alternator when a preselected alternator high temperature signal is received by said processing means to thereby provide alternator thermal shutdown protection.

16. Apparatus of claim 15 further characterized by said alternator comprising rotor means connected to and adapted to be rotated by said drive means, said apparatus including means for providing to said processing means signals indicative of alternator output current and speed of said rotor means.

17. A battery recharging and maintenance system comprising:
   (a) a battery connected for (i) supplying energy to electrical load apparatus, and (ii) receiving recharging energy from an alternator;
   (b) an alternator connected to drive means for producing electrical energy and connected to supply electrical energy to said electrical load apparatus and to said battery;
   (c) voltage regulator means connected to said alternator and adapted to control said alternator so as to vary the magnitude of the voltage output of said alternator as a function of a control signal applied to said voltage regulator means;
   (d) voltage regulator control means adapted to produce a control signal and being connected to control said voltage regulator means to thereby vary said voltage output of said alternator and thus vary the charging current of said battery, said alternator comprising (i) field coil means for receiving control current from said voltage regulator means, and (ii) rotor means connected to and adapted to be rotated by said drive means, said voltage regulator control means comprising means for monitoring said control current in said field coil means and for monitoring the angular velocity of said rotor means.

18. Apparatus of claim 17 including means for periodically estimating charging current of said battery and for applying a signal indicative thereof to processing means to provide an estimate of SOC of said battery.

19. Apparatus of claim 18 wherein said means for periodically estimating charging current of said battery comprises means for implementing the equation: $IB=IA1-IA2 (A1/A2)$, where $IB$ is the estimated charging current of said battery; $IA1$ is the current output of said alternator when said alternator is at a first output voltage level $A1$; and $IA2$ is the current output of said alternator when said alternator is at a second voltage level $A2$.

20. Apparatus of claim 18 wherein said means for periodically estimating charging current of said battery comprises (i) means for calculating output current of said alternator at a first output voltage level $A1$ thereof, (ii) means for suddenly lowering said alternator output voltage level to a second voltage level $A2$, (iii) means for calculating output current of said alternator at said second voltage level $A2$, and (iv) processing means for implementing the equation: $IB=IA1-IA2 (A1/A2)$, where $IB$ is estimated charging current of said battery, $IA1$ is the calculated output current of said alternator when the output voltage thereof is a said first level $A1$, and $IA2$ is the calculated output current of said alternator when the output voltage thereof is at said second level $A2$.

21. Apparatus of claim 17 including means for providing a signal indicative of the temperature of said alternator to said processing means, said processing means functioning to reduce output voltage of said alternator when a preselected alternator high temperature signal is received by said processing means to thereby provide alternator thermal shutdown protection.

22. Apparatus of claim 21 including means for providing to said processing means signals indicative of alternator output current and speed of said rotor means.

23. Apparatus of claim 21 including means for providing to said processing means signals indicative of battery temperature.

* * * * *